March 9, 1937. T. O. WILTON ET AL 2,073,039
FLUE GAS WASHING AND PURIFICATION
Filed Sept. 9, 1931
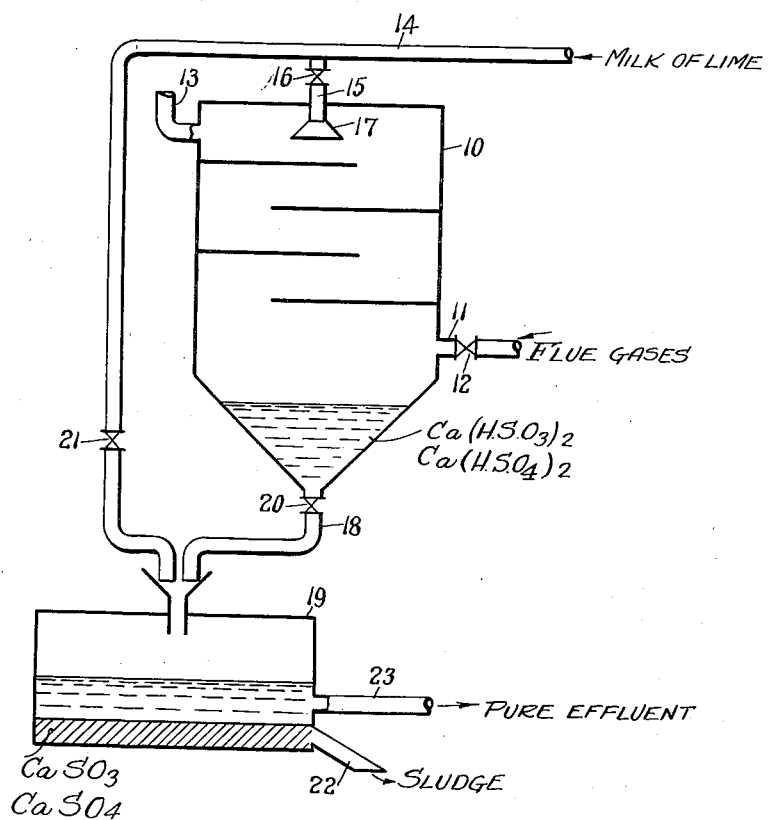
THOMAS OWSTON WILTON,
NORMAN WILTON,
HERBERT EDWARD JACKSON GREEN,
HAROLD CORNWALLIS MANN, Patented Mar. 9, 1937

2,073,039

UNITED STATES PATENT OFFICE 2,073,039

FLUE-GAS WASHING AND PURIFICATION

Thomas Owston Wilton, Norman Wilton, Herbert Edward Jackson Green, and Harold Cornwallis Mann, London, England Application September 9, 1931, Serial No. 561,990
In Great Britain September 18, 1930

2 Claims. (Cl. 23—2)

Many experiments have been conducted, over the last few years, in connection with the purification of flue gases and other gases containing sulphur in the form of $SO_2$ and $SO_3$, such as are produced in boiler houses, power stations and the like throughout the country, owing to the fact that the sulphur in the gases and the smoke has been found to have deleterious effects. We have recently experimented and invented a new process for the purpose of removing the oxides of sulphur from industrial gases and smoke containing them so as to eliminate the noxious fumes and gases and allow the gaseous products of the combination of fuel to be harmlessly discharged in the atmosphere.

The process according to our invention consists in washing flue gases with milk of lime, the process being carried out in two stages, the first using a quantity of lime insufficient to form the normal sulphite of lime with the quantity of oxides of sulphur present in the gases, and, secondly, after the washing medium has left the washers, adding more lime to the washing medium to bring about an excess of this compound, thus causing the whole of the sulphur lime compound to be precipitated. Settling tanks are provided beneath the washer so that calcium sulphate and calicum sulphite will be allowed to settle down from the liquid. This sludge, containing calcium sulphate and calcium sulphite, will be continually discharged from the settling tank. It has been found that as long as an excess of lime remains in the washing fluid, when this sludge is allowed to stand, the calcium sulphite and calcium sulphate substantially separate and settle down in the form of a sediment and that the clear solution, which can be pumped away for recirculation if desired, contains practically no material which would be declared to be noxious by the sewage authorities, the deleterious qualities of the effluent being practically nil. Any sooty material also settles out in a similar manner; it may be filtered from the liquor by means of a filter screen, or it may be left in the sediment.

It is desirable to carry out this process in such a way that the precipitation of the solid sulphur compounds takes place in the final stage of the process. This is obtained by performing the milk of lime treatment in two steps, the scrubbing of the flue gases and smoke being first performed with milk of lime in insufficient quantity to produce the normal calcium sulphite or sulphate, sufficient milk of lime being added subsequently, in the final stages of the process, to substantially complete the precipitation of the sulphur compounds in the solid form.

As an example, it is advantageous to carry out the process in this manner so as to substantially prevent the precipitation of the solid sulphur compounds inside the washer, and cause it to take place in separate settling tanks, where the task of collecting the precipitated sludge will be easier and more economical.

The drawing shows one form of apparatus which may be used in carrying out the process described above. This apparatus consists of a scrubber, generally designated 10, having an inlet 11 for flue gases controlled by a valve 12 in the lower portion of the scrubber. In the upper portion of the scrubber is located an outlet pipe 13 for the flue gases. A pipe 14 conveys the milk of lime solution to a branch 15 controlled by a valve 16, and having a sprayer 17 by which the milk of lime solution is sprayed into the interior of the scrubber 10. By adjusting the valves 16 and 12 the relative proportions may be varied between the quantity of flue gases and milk of lime solution so that the milk of lime will be in insufficient quantity to produce the normal calcium sulphite or sulphate.

As the flue gases pass upwardly through the milk of lime solution, the sulphur dioxide and sulphur trioxide gases are acted upon by the solution, converted into soluble calcium compounds and conveyed to the lower portion of the scrubber, whence they pass downwardly through the discharge pipe 18 into the settling tank 19, the pipe 18 being controlled by a valve 20. The pipe 14, meanwhile, continues beyond the branch pipe 15 to enter the settling tank 19, and is controlled for this purpose by a valve 21. Accordingly, in the settling tank 19 the hitherto soluble calcium compounds may be supplied with a quantity of milk of lime solution, through the pipe 14, sufficient to convert them into the relatively insoluble calcium sulphite or sulphate. This settles as a sludge into the bottom of the tank, and may be removed by way of the sludge line 22. The purified liquid passes out of the settling tank 19 by way of the pipe 23.

The use of a washing medium containing lime in excess in connection with the washing of flue gases and smoke in this manner is a novelty. The method has important advantages: By washing the flue gases and smoke in this way in our scrubber, and by allowing the sludge to settle as described above, so as to separate the solid matter from the liquor, the compounds having a strong affinity for oxygen which are dissolved or suspended in the liquor, which render it deleterious, are removed; when water only is used enormous volumes of this liquid are used for scrubbing flue gases, and, under the best absorption conditions, the resulting liquor is highly acid. This is obviated in the present process: The washing liquid can be maintained in a non-acid condition by the continuous addition of fresh lime water before recirculation, the effluent being tested for alkalinity or acidity and the quantity of fresh lime added to the circulating liquid being regulated accordingly. The fact that the washing liquid is maintained non-acid extends considerably the life of the scrubber, and allows the latter to be made of steel instead of other metals less corrodible by acids, as was necessary heretofore.

Another advantage of the present modification of the process is that, under certain conditions, it may prevent, or at any rate lessen, the formation of scale on the walls of the washer. By means of the process the consumption of water may be reduced to a degree hitherto never obtained, namely one ton of water per ton of coal used if the effluent is run to waste, or if it be recirculated the water used is only that necessary for making up the losses due to evaporation, leakage etc.

We have found that carbonate of lime may be used instead of, or mixed with, milk of lime.

Water from any source of supply which is convenient either owing to its location or its abundance can, of course, be used. Sea water, for example, can be used, if desired, for making the milk of lime.

It is understood that the quantity of water used is in excess of that theoretically required for making a milk of lime of the concentration required, to make up the losses by evaporation, which are considerable owing to the relatively high temperature of the gases subjected to the washing treatment.

The process can be worked at different temperatures, as may be found most advantageous. The first stage of the process may be carried out in the scrubber described in the specification of our copending application for Letters Patent No. 399,927.

What we claim and desire to secure by Letters Patent is:—

1. A process for washing flue gases containing $SO_2$ and $SO_3$ in two stages, which comprises washing the flue gases in the first stage with milk of lime in insufficient quantity to form the normal sulphite and sulphate so that bisulphite and bisulphate of calcium are formed, and in the second stage adding further milk of lime to the liquor in an amount sufficient so that the bisulphite and bisulphate are transformed into the insoluble normal sulphite and sulphate and precipitated as such, leaving a substantially pure effluent.

2. A process for washing flue gases containing $SO_2$ and $SO_3$ in two stages, which comprises washing the flue gases in the first stage in a scrubber with milk of lime in insufficient quantity to form the normal sulphite and sulphate so that bisulphite and bisulphate of calcium are formed, and in the second stage adding further milk of lime to the liquor on emerging from the scrubber in an amount sufficient so that the bisulphite and bisulphate are transformed into the insoluble normal sulphite and sulphate and precipitated as such leaving a substantially pure effluent.

THOMAS OWSTON WILTON.
NORMAN WILTON.
HERBERT EDWARD JACKSON GREEN.
HAROLD CORNWALLIS MANN.